350-164. XR 3551590 SR

United States Patent [11] 3,551,590

[72] Inventor Wilson P. Boothroyd
Carlisle, Mass.
[21] Appl. No. 646,061
[22] Filed June 14, 1967
[45] Patented Dec. 29, 1970
[73] Assignee Sylvania Electric Products Inc.
a corporation of Delaware

[54] SINGLE TUBE COLOR TELEVISION CAMERA
6 Claims, 5 Drawing Figs.

[52] U.S. Cl. 178/5.4, 350/164
[51] Int. Cl. H04n 5/42
[50] Field of Search 350/164, 317; 178/5.4F, 5.4TCC, 5.4STC

[56] References Cited

UNITED STATES PATENTS 3,407,265 10/1968 Krause 178/5.4(STC)
3,109,886 11/1963 Boothroyd 178/5.4(F)
3,300,580 1/1967 Takagi et al. 178/5.4(STC)
3,410,626 11/1968 Magrath 350/317

FOREIGN PATENTS 1,096,409 1/1961 Germany 178/5.4(STC)

*Primary Examiner*—Richard Murray
*Assistant Examiner*—Anthony H. Handal
*Attorneys*—Norman J. O'Malley and Elmer J. Nealon

ABSTRACT: A single image tube color television camera employing an image tube having operatively associated therewith an optical filter composed of a plurality of vertically disposed red, green and blue light transmissive stripes separated by opaque stripes and arranged in a repetitive horizontal sequence. A set of phasing stripes are arranged on one side of the colored stripe array to synchronize the color decoding operation. The output signal from the pickup tube contains two components, one containing the color video information and the other, information representing the position of the vidicon beam relative to the color stripe array. Individual color signals are provided by digital gating circuitry controlled by the phasing signal.

INVENTOR.
WILSON P. BOOTHROYD

BY Stanley M. Schwarz
ATTORNEY.

INVENTOR.
WILSON P. BOOTHROYD

BY Stanley M. Schlesinger
ATTORNEY.

SINGLE TUBE COLOR TELEVISION CAMERA

BACKGROUND OF THE INVENTION

This invention relates to color television cameras and more particularly to cameras employing a single image tube.

Color television cameras generally employ three pickup or image tubes, each associated with a respective color filter and operative to provide a signal representing respective color components of a scene being viewed by the camera. The three pickup tubes are usually responsive to the respective primary colors, red, green and blue, and provide three signals representing these color components which, when combined in a suitable display provide a full color rendition of a scene. A fourth pickup tube is often provided in conventional television cameras to provide luminance information to enhance the sensitivity and contrast of the camera. The multiple pickup tubes must be synchronously scanned and must be in accurate optical alignment so that they are identically viewing a particular scene. When so synchronized and aligned, these cameras provide acceptable color information but they are extremely expensive and require continual maintenance to remain in proper working condition. Furthermore, conventional color cameras require circuitry of relatively wide bandwidth and wide dynamic range, thereby suffering the design complexities and problems associated with such circuits.

SUMMARY OF THE INVENTION

In accordance with the present invention, a relatively simple and efficient single tube color camera is provided which employs a pickup or image tube having operatively associated therewith an optical filter comprising an array of vertically disposed red, green and blue light transmissive stripes separated by opaque stripes and arranged in a repetitive horizontal sequence, together with a set of transparent noncolored stripes separated by opaque stripes and vertically disposed on one side of the array to provide phasing information for accurate color decoding. Accurate horizontal deflection can be provided via a phase lock loop control, and video signal processing is accomplished with relatively narrow band circuitry by providing two components of the video signal, one including the color information and the other an index signal representing the position of the image tube beam with respect to the color filter. Color information is provided by digital sampling circuitry gated by the index signal to produce respective color signals in synchronism with the scanning of corresponding color stripes by the image tube beam.

DESCRIPTION OF THE DRAWINGS

The invention will be more fully described in the following detailed description taken in conjunction with the accompanying drawings, in which.

DETAILED DESCRIPTION OF THE INVENTION

Figure 1:
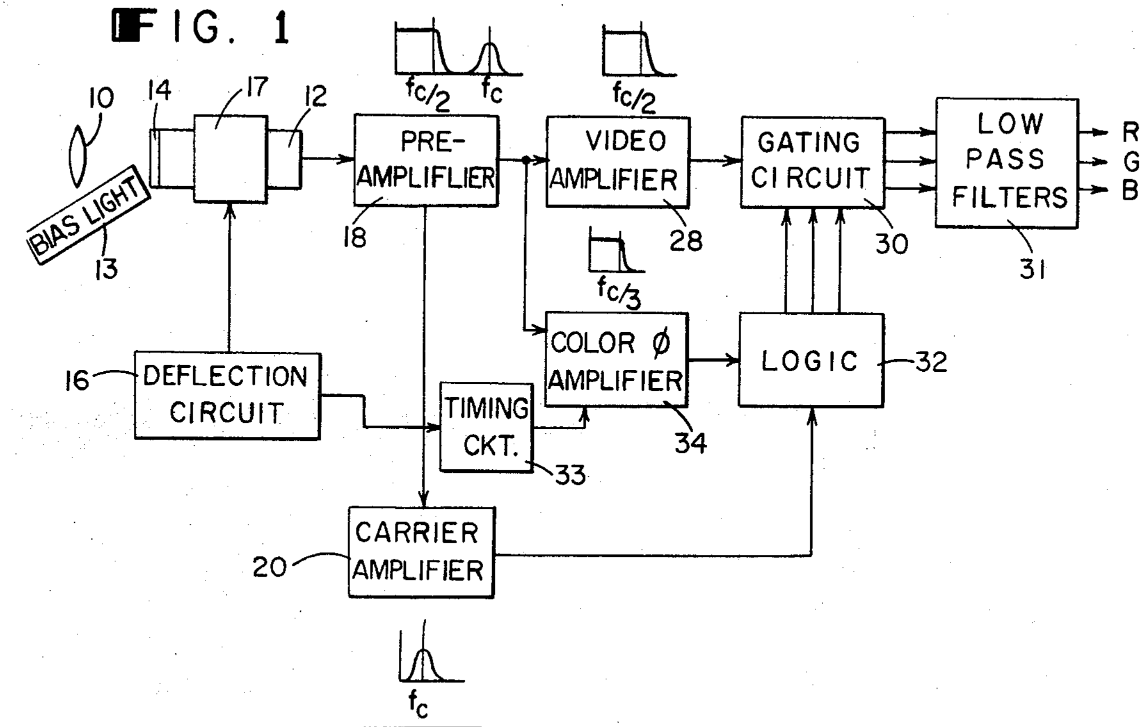
FIG. 1 is a block diagram representation of a color camera according to the invention.

Referring to FIG. 1, light from a scene being viewed is focused by a lens 10 onto the face of an image tube 12, such as a vidicon, having associated therewith an optical filter 14 composed of vertically disposed red, green and blue light transmissive stripes arranged in a repetitive horizontal sequence across the face of tube 12. Raster scanning of the image tube beam is accomplished in the conventional manner by horizontal and vertical deflection circuitry 16 which provides the requisite scanning signals to a deflection means 17. The output signal of the image tube is applied to a preamplifier 18 and, after preamplification, to a video amplifier 28 and thence to a gating circuit 30 which provides individual red, green and blue brightness signals, which are then filtered in low pass filters 31 to provide conventional analogue video signals. The gating circuit, which will be described in detail hereinafter, is driven by logic circuitry 32 which, in turn, is driven by signals from carrier amplifier 20 and by signals from a color phase amplifier 34, which signals are derived from the image tube output signal. Phase amplifier 34 provides a synchronizing signal only during a portion of each sweep of the camera tube beam, and logic 32 is clocked by signals from the phase amplifier when it is operative during a portion of each sweep, and from carrier amplifier 20 for the balance of each sweep.

Figure 2:
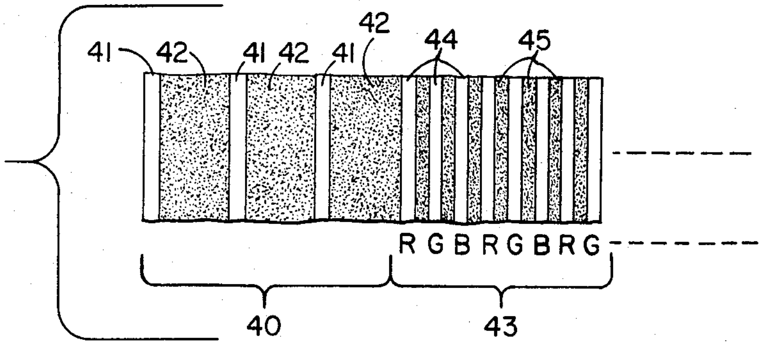
FIG. 2 is a greatly exaggerated schematic representation of a portion of an optical filter according to the invention.

A portion of the optical filter 14 associated with the image tube is illustrated in exaggerated form in FIG. 2 and includes a plurality of light transmissive vertically disposed stripes separated by opaque stripes. A first group of stripes 40 is composed of transparent stripes 41, each separated by a wider opaque stripe 42. A second group of stripes 43 is composed of stripes 44 which are of the dichroic interference type and which are arranged in any repetitive horizontal sequence of red, green and blue light transmissive stripes, each stripe also being separated from adjacent ones via an opaque stripe 45. The sequence red, green and blue is designated in the illustrated filter by the letters R, G and B. These interference filters are composed of multiple layers of material having alternate high and low index of refraction, each layer being one quarter wavelength thick at the center frequency of the light to be transmitted. Color separation is provided by these filters with much less attenuation than with absorption type optical filters. Of course, if sufficient light is available to illuminate a scene to be telecast, such absorption filters can also be employed in a camera according to the invention. To prevent color crosstalk caused by the camera tube electron beam impinging upon more than one colored stripe at a time, the stripes are dimensioned in width relative to the spot size of the electron beam to minimize the signal contributions of adjacent stripes to a particular stripe under scan. In the embodiment of the invention described herein, for example, the electron beam "spot" is designed relative to the dimensions of the stripe array to lie within the width of one transmissive stripe and its adjacent opaque stripes.

Figure 3:
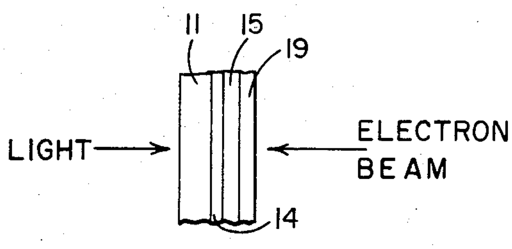
FIG. 3 is a greatly exaggerated diagrammatic view of an optical filter embodied in a camera tube.

The filter is employed in an otherwise conventional image tube, such as a vidicon, and is formed on the inside surface of the image tube faceplate with a conventional photoconductive target and conductive transparent film deposited over this filter. As illustrated schematically in FIG. 3, the filter array 14 is formed on the inside surface of faceplate 11 of the image tube 12, and a compatible transparent conductive film 15 is formed over the filter, with a conventional photoconductive target 19 having adequate chromatic sensitivity formed over film 15. Light from a scene being viewed is imaged through faceplate 11, color filter 14 and transparent conductive layer 15 onto photoconductive layer 19 to produce a conductive pattern in the photoconductive layer which represents the intensity of the colored light impinging upon this layer. The electron beam of the image tube scans this photoconductive layer in a conventional raster pattern to produce a video signal in the usual manner; however, this video signal is, by reason of the optical filter array, now a composite signal having components representing each color as well as a component representing the position of the beam relative to the stripe array.

In a typical embodiment employed in a vidicon tube with an approximate 1 × ¾inch raster, the filter is composed of 400 three-color triplets comprising 1,200 colored stripes, each stripe being approximately 400 microinches wide and separated from adjacent colored stripes by opaque stripes of the same width. An additional set of transparent noncolored stripes of the same width are provided on one side of the stripe array, and opaque stripes of a width five times one stripe width separate these transparent stripes so that the noncolored stripes are dimensionally related to one set of the colored stripes in the array such that when scanned by an electron beam they will be in synchronism with that color. Six or more stripes may comprise this set, which is preferably located so as to be scanned at the start of each raster scanning line.

As the electron beam of the image tube scans the photosurface the signal output comprises an amplitude modulated pulse train with a frequency spectrum having a baseband, carrier, sideband and harmonic components, with the amplitude of each pulse corresponding to the light incident on a corresponding stripe. A signal of fundamental frequency $f_c$ is generated due to the periodic scan of the photosurface exposed between the opaque stripes 42 across the tube face. The fundamental component of this signal, termed the carrier frequency, is therefore synchronized with the stripe array and is not phase sensitive to variations of light patterns in the photosurface. To maintain an adequate level of carrier frequency signal, sufficient light must impinge upon tube 12 to produce a signal as the beam scans each stripe of the array. In practice, there will usually be sufficient light reaching the tube to maintain the carrier signal, but an unmodulated bias light 13 which projects white light onto the tube face can be employed to assure sufficient illumination for this purpose. The unmodulated component of the video signal caused by the bias light can easily be deleted from the finally processed signal by well-known threshold circuitry.

To process the wideband pulse signals from the image tube in a conventional manner to derive independent red, green and blue channel video signals would require circuitry having a bandwidth including several harmonics of the carrier frequency. Such wide bandwidth requirements are relaxed in accordance with the present invention by narrow band processing and subsequent sampling of the narrow band baseband signal. Accordingly, preamplifier 18 has a passband as shown in FIG. 1 extending to $f_c/2$ to pass the baseband video information, and a second passband symmetrical around $f_c$ to pass the carrier. Alternatively, a bandwidth extending to $f_c$ could be provided to pass the desired signals. The video amplifier has a passband of $fc/2$ to process the video information, while the carrier amplifier 20 has a passband symmetrically centered at $f_c$ to pass the carrier. Color phase amplifier 34 has a passband at $f_c/3$ necessary to pass the phasing signals generated by stripes 41 and used to synchronize the decoding logic.

AS the image tube beam scans the filter stripe array, signal pulses are produced which correspond to the light from a scene passing through the color filters. Adjacent pulses represent color data from different color stripes, and it is desired to amplify these individual "color" pulses without crosstalk from adjacent pulses. As is known from the art of data transmission, the baseband component of a video signal can be sampled at the Nyquist interval $\frac{1}{2f}$ to achieve an optimum signal to noise ratio. Thus, such baseband signal processing by video amplifier 28, and sampling by circuits 30 and 32, is employed in the instant invention to provide the desired signals with minimum crosstalk. Since the baseband video signal and the gating signals occupy different segments of the frequency spectrum and are amplified by separate amplifiers, it is important to control the relative time delay of these amplifiers to insure proper functioning of the gating circuitry.

The baseband signal from video amplifier 28 is applied to gating circuit 30, which also receives gating signals from logic 32 which, in turn, is driven by signals from carrier amplifier 20 and phase amplifier 34. the gating sequence is phased to the filter stripe array and to the horizontal beam scan at the beginning of each sweep by means of a timing signal from phase amplifier 34 which is energized for the portion of each sweep during which the image tube beam is scanning the group of stripes 40. Amplifier 34 receives a signal from preamplifier 18 and is gated on by a gating pulse produced by a timing circuit 33 which is energized by the horizontal deflection signal for an interval during the beginning of each sweep during which interval the phasing stripes of filter 14 are being scanned. These phasing stripes are in timed relation to a selected one of the colored filter stripes, say red, and thereby cause a signal which is phased to the "red" signals. Logic 32 is thereby suitably timed so that color signal components are gated and channelized by circuit 30 in correspondence with the correct colors. Clocking of logic 32 for the balance of each sweep is afforded by carrier amplifier 20.

Each channelized output of gating circuit 30 is a modulated pulse train which is applied to low pass filters 31 to provide analogue video signals representative, respectively, of the red, green and blue brightness of the scene as scanned by the image tube. These analogue signals can then be further processed in a conventional manner to provide a standard composite television signal.

Figure 4:
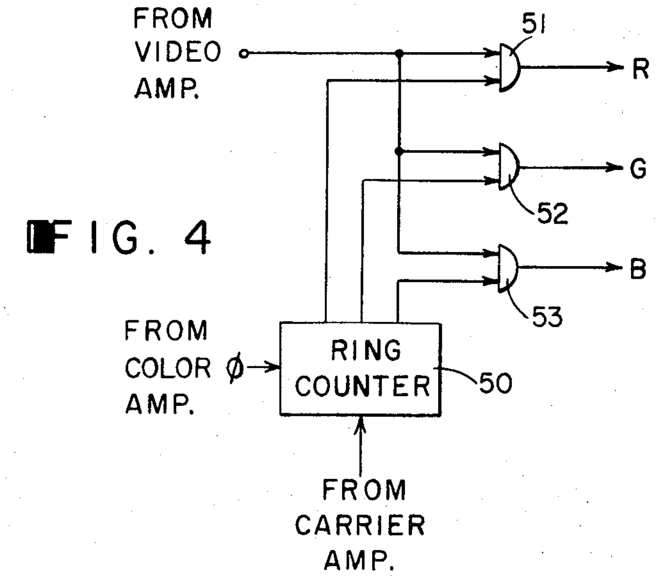
FIG. 4 is a block diagram representation of the gating circuitry shown generally in FIG. 1.

Gating circuit 30 and logic 32 are shown in greater detail in FIG. 4. A ring counter 50 receives the signal from color phase amplifier 34 and also receives the signal from carrier amplifier 20, and provides a gating signal sequentially to each of three AND gates 51, 52 and 53. The ring counter is clocked by the phase amplifier signal during the portion of each sweep when this signal is available, that is, during the interval during which the phasing stripes of the filter array are being scanned. For the balance of each sweep, the counter is clocked by the carrier amplifier signals. The counter includes frequency division circuitry to divide-by-three the clocking frequency to appropriately energize AND gates 51, 52 and 53 in synchronism with the respective color components. Signals from video amplifier 28 are simultaneously applied to all three AND gates and the sequential gating of these AND gates by the ring counter causes the sequential functioning of the channel amplifiers in circuit 30.

In the above-described embodiment, the scan linearity of the camera system must be sufficiently precise to prevent color cross talk. Scan linearities of better than 0.1 percent are achievable with a stabilized circuit design to provide carrier frequency stability of approximately ±21 KHz. Such stability is adequate to permit the use of delay compensated circuits having substantially constant delay over the required range of carrier and baseband frequency deviation.

Figure 5:
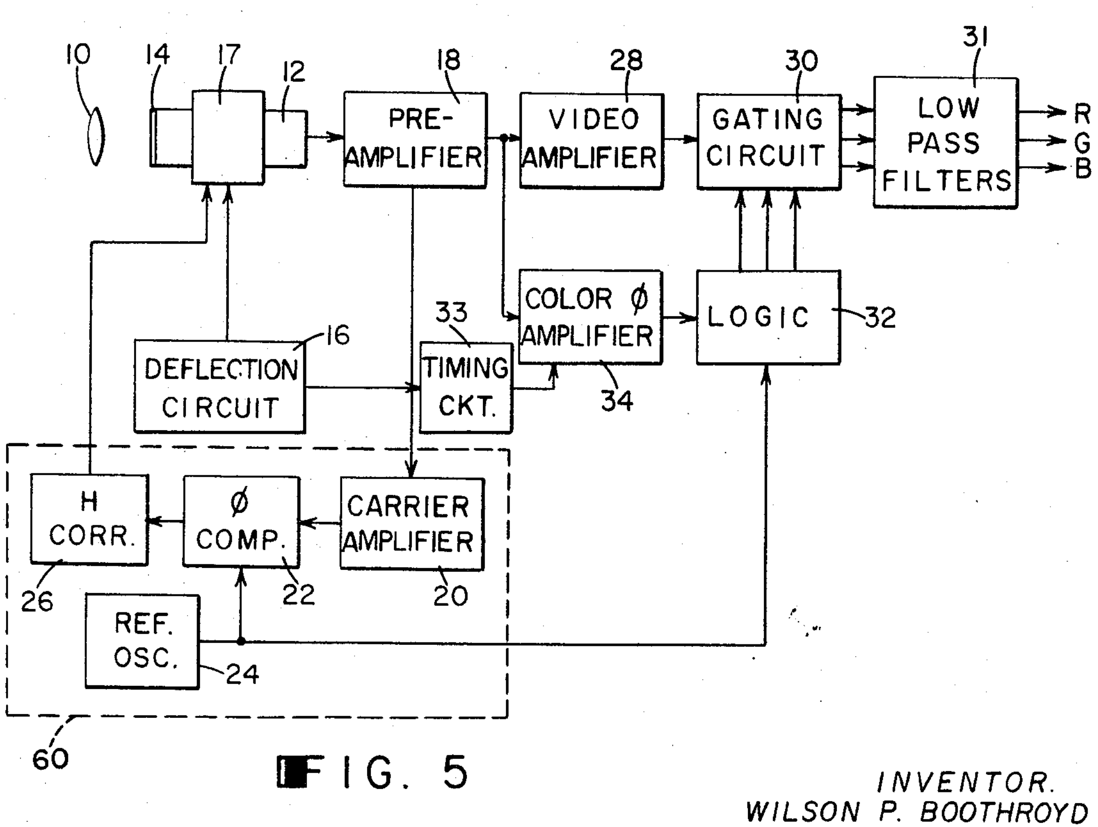
FIG. 5 is a block diagram representation of an alternative embodiment of the invention.

Extremely precise scan linearity, and ocrrespondingly precise carrier frequency stability, can be accomplished by the alternative embodiment of the invention illustrated in FIG. 5. This embodiment is similar in construction and operation to that of FIG. 1, but with the addition of a phase lock loop 60 which compensates for phase and frequency variations in the carrier signal of image tube 12 which may be caused by nonlinear horizontal scanning.

The phase lock loop comprises a carrier amplifier 20 which is operative to extract the carrier $f_c$ from the preamplified image tube output signal and to apply this carrier signal to one input of a phase comparator 22. The other input to the phase comparator is a reference signal from a frequency stable reference oscillator 24. The reference oscillator provides a signal having a frequency which is derived from and is an even multiple of the standard horizontal line scan frequency. For an active line scan time of the filter stripe array of 56$\mu$sec., a reference frequency of approximately 21.5 MHz is employed. The output of phase comparator 22 is applied to a horizontal correction circuit 26, the output of which is applied to deflection means 17. Any deviation in the frequency or phase of the carrier signal is sensed by phase comparator 22 which produces an error signal which causes correction circuit 26 to produce an appropriate deflection correction signal. The effect of the correction signal is to negate or substantially reduce any nonlinearity which may occur in the deflection of the image tube beam, with consequent improvement in the frequency stability of the image tube output signal.

I claim:

1. A color television camera comprising an image tube having operatively associated therewith an optical filter having an array of light transmissive red, green and blue stripes disposed in a direction orthogonal to the direction of the scan of the beam of said image tube, said stripes being separated by opaque stripes and arranged in a repetitive sequence in the direction of image tube scan, means for scanning the image tube beam in a raster pattern and for producing a composite image tube output signal comprising a baseband signal component containing color video information and a carrier signal component containing positional information of the image tube beam relative to the optical filter, said carrier signal component being produced in response to predetermined ones of the transmissive red, green and blue stripes being scanned by the image tube beam and having a frequency related to the spacings between said predetermined ones of the transmissive red, green, and blue stripes, means for separating the composite image tube output signal into its baseband and carrier signal components, gating means operative in response to the baseband and carrier signal components to provide signals representing the red, green and blue color information of a scene being viewed by said camera, and a phase lock loop operative in response to a signal from said image tube to maintain the scanning linearity of said camera.

2. The invention according to claim 1 wherein said optical filter is of the dichroic interference type and is formed on the inside surface of the image tube face.

3. The invention according to claim 1 wherein said gating means includes a circuit for sequentially providing red, green and blue color information in synchronism with the scanning of said optical filter.

4. The invention according to claim 1 wherein said light transmissive stripes are of equal width and said opaque stripes are of the same width, and said optical filter further includes a set of transparent noncolored stripes separated by wider opaque stripes and arranged on one side of said stripe array with said transparent stripes in positional synchronism with one color of said stripe array.

5. The invention according to claim 1 wherein said gating means includes means operative in response to said baseband and carrier signal components to sample the baseband signal component at the Nyquist rate and in synchronism with the scanning of said stripe array to produce individual signals respectively representing said red, green and blue color information.

6. A color television camera comprising an image tube having operatively associated therewith an optical filter having an array of light transmissive red, green and blue stripes disposed in a direction orthogonal to the direction of scan of the beam of said image tube, said stripes being separated by opaque stripes and arranged in a repetitive sequence in the direction of image tube scan, means for scanning the image tube beam in a raster pattern, means for separating the image tube signal into a first component containing color video information and a second component containing positional information of the image tube beam relative to the optical filter, gating means operative in response to said first and second components to provide signals representing the red, green and blue color information of a scene being viewed by said camera, and a phase lock loop operative in response to a signal from said image tube to maintain the scanning linearity of said camera.